(12) United States Patent
Witherspoon et al.

(10) Patent No.: US 12,517,503 B2
(45) Date of Patent: Jan. 6, 2026

(54) NON-EVENT NOTIFICATION SYSTEM

(71) Applicants: Kathleen Borland Witherspoon, Kissimmee, FL (US); Andrew Thomas Witherspoon, Kissimmee, FL (US); Michael Carlini, Mohnton, PA (US)

(72) Inventors: Kathleen Borland Witherspoon, Kissimmee, FL (US); Andrew Thomas Witherspoon, Kissimmee, FL (US); Michael Carlini, Mohnton, PA (US)

(73) Assignee: KAW Industries LLC, Kissimmee, FL (US)

( * ) Notice: Subject to any disclaimer, the term of this patent is extended or adjusted under 35 U.S.C. 154(b) by 245 days.

(21) Appl. No.: 18/289,391

(22) PCT Filed: Jun. 21, 2022

(86) PCT No.: PCT/US2022/034238
§ 371 (c)(1),
(2) Date: Nov. 3, 2023

(87) PCT Pub. No.: WO2022/271626
PCT Pub. Date: Dec. 29, 2022

(65) Prior Publication Data
US 2024/0241507 A1 Jul. 18, 2024

Related U.S. Application Data

(60) Provisional application No. 63/213,874, filed on Jun. 23, 2021.

(51) Int. Cl.
*G05B 23/02* (2006.01)
*G08B 21/04* (2006.01)

(52) U.S. Cl.
CPC ..... *G05B 23/0227* (2013.01); *G08B 21/0423* (2013.01)

(58) Field of Classification Search
CPC .................. G05B 23/0227; G08B 21/0423
See application file for complete search history.

(56) References Cited

U.S. PATENT DOCUMENTS

| | | | |
|---|---|---|---|
| 7,292,960 B1 | 11/2007 | Srinivasa et al. | |
| 9,159,217 B1 | 10/2015 | Logan et al. | |
| 9,386,140 B2 | 7/2016 | Logan et al. | |
| 9,888,452 B2 | 2/2018 | Logan et al. | |
| 2002/0005782 A1 | 1/2002 | Sakai et al. | |
| 2005/0108326 A1 | 5/2005 | Tuttle | |
| 2010/0120011 A1 | 5/2010 | O'Brien | |
| 2015/0294553 A1 | 10/2015 | Logan et al. | |
| 2016/0027278 A1* | 1/2016 | Mcintosh | G08B 21/0423 715/741 |

(Continued)

OTHER PUBLICATIONS

US Patent and Trademark Office, International Search Report in corresponding PCT/US2022/034238, Oct. 5, 2022, 11 pages.

*Primary Examiner* — Mi'schita' Henson
(74) *Attorney, Agent, or Firm* — Hooker & Habib, P.C.

(57) ABSTRACT

A computer-implemented notification system automatically generates a notification if the system determines that a non-event has occurred related to operation of a device being monitored by the notification system. The notification may be transmitted to one or more third parties upon the expiration of a time frame in which the device event was expected to occur.

20 Claims, 9 Drawing Sheets

(56) References Cited

U.S. PATENT DOCUMENTS

| | | |
|---|---|---|
| 2017/0155526 A1 | 6/2017 | Li |
| 2021/0203157 A1* | 7/2021 | Visweswariah ...... G06N 3/0442 |
| 2022/0230746 A1* | 7/2022 | Anthapur ............... G16H 40/67 |
| 2025/0040808 A1* | 2/2025 | Tran ................... G08B 21/0492 |

* cited by examiner

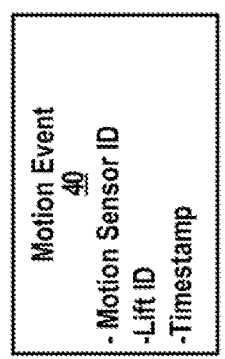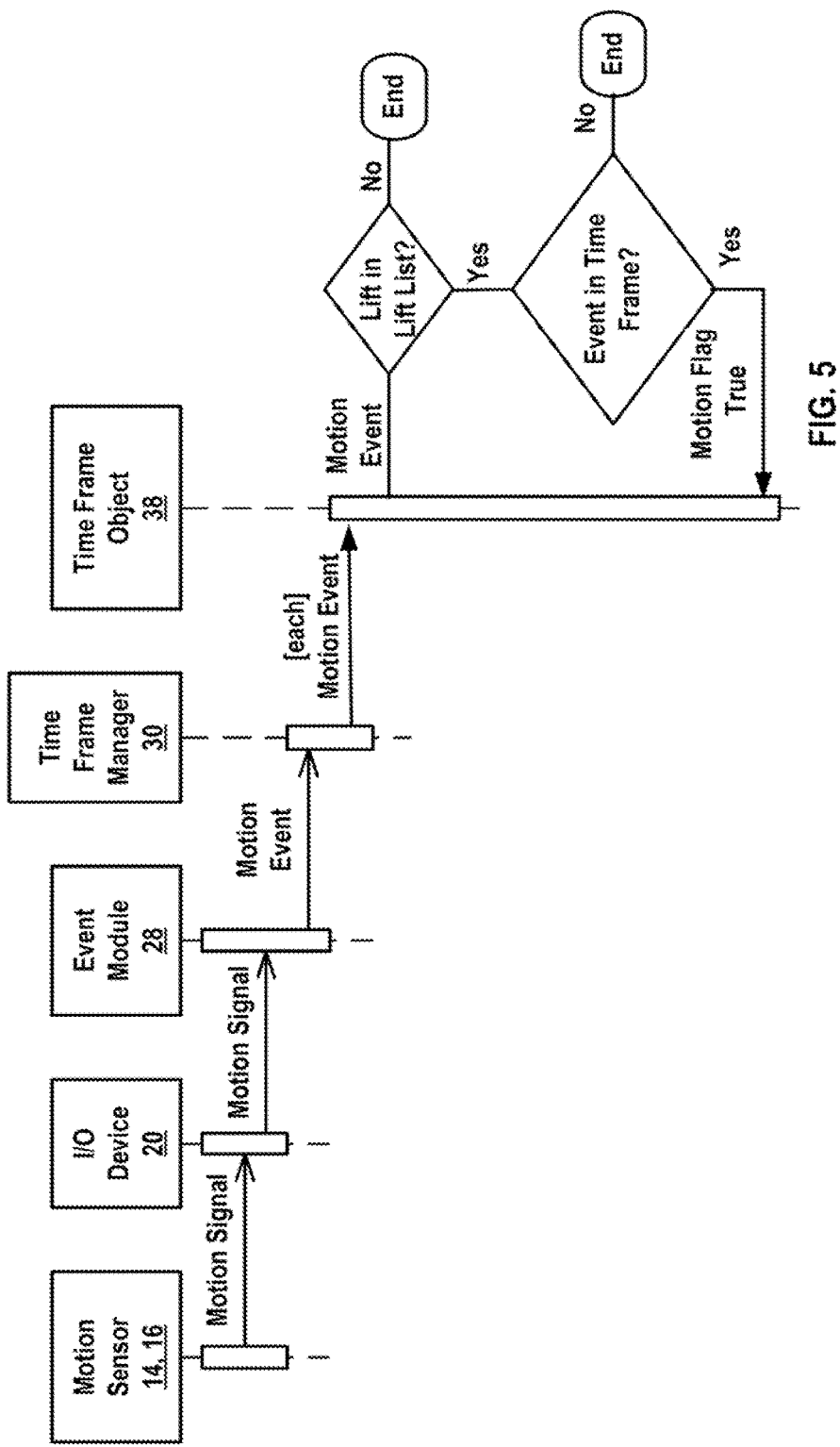

NON-EVENT NOTIFICATION SYSTEM

FIELD OF THE DISCLOSURE

This disclosure relates generally to systems that provide notifications transmitted through a network, and more specifically, to a system that monitors a device for a device event occurring within a predefined time period and automatically issues a notification through the network if the device event does not occur within the time period.

BACKGROUND OF THE DISCLOSURE

Devices may be required to be operated within a specific time period referred to as a time frame herein. For a relatively simple example, a coffee maker may be operated in a fifteen minute time frame beginning at 7 AM and ending at 7:15 AM in the morning so that hot coffee is available for breakfast.

Operation of the device might be desired to occur at a variable time within the time frame, the time frame having a start time and an end time. It may be desirable to notify a third party or third parties at the end of the time frame of the failure of the device to operate within that time frame.

For example, residential elevators and stairlifts provide mobility for elderly and other mobility-impaired users.

Many mobility-impaired users follow a regular daily routine, for example, getting up each day at about the same time in the morning and retiring to bed each day at about the same time in the evening. As a result, the elevator or stairlift is often used on a regular basis within the same time frame each day or for each specific day of the week (for example, the usage pattern may change on weekends).

Some mobility-impaired users live alone. It would be desirable that family members or others who don't live with the user be automatically notified if the elevator or stairlift was not used within the expected time frame. Such non-use may signify a possible medical or physical problem with the user.

Thus there is a need for a notification system that automatically generates a notification if the system determines that a device related event that was expected to occur within a specific time frame did not occur within that time frame. A device-related event that was expected to occur within a time-frame but did not occur in that time frame is referred to as a "non-event" herein.

SUMMARY OF THE DISCLOSURE

Disclosed is a computer-implemented notification system that automatically generates a notification if the system determines that a non-event has occurred. The notification may be transmitted to one or more third parties immediately upon the expiration of the time frame in which the device event was expected to occur.

The notification may be transmitted to the one or more remote third parties to inform each third party of the possibility of, for non-limiting examples, that the notification was generated because of a medical condition, negligence or carelessness, or an environmental condition (for example, a mechanical breakdown, flooding event, or other cause). The notification may be transmitted to third parties by pushing the notification to remote mobile device apps, to desktop apps, to email servers, and the like, by text message, or other known methods of communication.

Some embodiments of the disclosed notification system include sensors or other output devices incorporated into the device specifically configured to inform a software application of a controller of the notification system that a device event has occurred. The device event information may include a timestamp representing the date/time of the device event, or the application software may generate a timestamp associated with the device event upon being informed of the device event. The notification system may be informed of the device event by wired or wireless signal transmission.

Embodiments of a device event may be the device powering on or powering off, initiation or stoppage of motion of the device, or some other change or modification of device operating state or condition. Embodiments of the notification system associated with devices that include sensors designed to transmit signals or data representative of device events to the notification system are referred to as "dedicated notification systems" herein.

Alternative embodiments of the disclosed non-event notification system do not modify the device being monitored by the notification system and do not rely on the device having sensors transmitting device events to the notification system. Such embodiments of the notification system are referred to as "generic notification systems" herein.

Device events of possible embodiments of a generic notification system in accordance with this disclosure may, for a non-limiting example, be the device powering on or powering off. A possible embodiment of a generic notification system may include a "smart plug" that is inserted into a standard electrical socket and receives the power plug of the device being monitored. The smart plug may include a microprocessor running a real-time operating system (RTOS), memory accessed by the microprocessor that enables the microprocessor to execute application software placed into the memory, and a signal transmission module that can transmit signals from the smart plug under the control of the application software. The signal transmission module in possible embodiments of the smart plug may transmit signals wirelessly via standard wireless protocols such as Wi-Fi or Bluetooth.

Standard electrical sockets may, in other embodiments of the disclosed notification system, be modified to include the smart plug capability discussed in the preceding paragraph.

The smart plug application software monitors the power being transmitted to the device from the electrical socket through the smart plug. Powering on and/or powering off of the device causes the application software to recognize a power event (a POWER ON event when the power used by the device increases such as the device going from a power-off state to a power on state, and/or a POWER OFF event when the power used by the device decreases such as the device goes from a power-on state to a power-off state). The power event includes a time stamp associated with the event. The smart plug can transmit signals or data representing power events to the software application or controller of the notification system.

Application software of either a dedicated notification system or generic notification system may utilize software time-frame objects that define a time frame that include a start time and an end time. The start time and end time of a time-frame object may each be associated with a specific day, a specific day of the week, a specific month, or other calendar period. A time-frame object may internally maintain one or more Boolean device event flags (for example, a POWER ON flag and/or a POWER OFF flag) and set using the timestamp associated with the device event. The Boolean event flag(s) represent whether a device event of interest to the time-frame object has occurred between the start time and end time of the time-frame object.

A time-frame object may itself issue a software event or other notifying means at the end time of the time-frame object informing the application software whether or not a device event has occurred within the time frame of the time-frame object. The application software may use that information to determine whether or not to issue third party notifications. The time-frame object may clear its flag(s) after issuing its software event.

The time-frame objects and the application software that decides whether or not to issue third party notifications may, in some embodiments of a generic notification system, be stored in the memory of the smart plug. The smart plug application software then utilizes the power events and time-frame objects to determine whether or not to issue third party notifications.

The time-frame objects and the application software that decides whether or not to issue third party notification may, in other embodiments of a generic notification system, run on a remote computer (a desktop computer, cloud computer, smart phone, tablet, etc.). The power plug application generates and transmits a device event signal received by the remote computer containing data about the device event. The remote computer application software utilizes the received device events and its time-frame objects to determine whether or not to issue third party notifications.

The disclosed notification system software may provide a user interface that enables creating, editing, and deleting time-frame objects, may enable creating, editing, and deleting a list of those parties who should receive the notifications issued by the notification system, and how a notification should be transmitted to a party (by push notification to an app, email, text message, etc.) and associated party data to enable transmission (email address, cell phone number, etc.).

Embodiments of the disclosed non-event notification system may recognize different types of device events, and each type of device event may have time-frame objects associated with that type device event only. Device events may be sensed by different types of sensors, such as, but not limited to, motion sensors, imaging sensors, pressure sensors, door sensors, window sensors, flow sensors, thermometers or thermocouples, proximity sensors, power monitors, current sensors, voltage sensors and the like. The sensor outputs a signal or data that enables a controller to determine whether a device event has occurred, for example by receiving a signal from the sensor indicating a device event has occurred or by reading data received from the sensor that enables the controller to determine whether a device event has occurred.

For example, an embodiment of the disclosed notification system may monitor an elevator and have a software time-frame object associated with the elevator defining a time frame having a start time of 7 AM and an end time of 9 AM local time. The time-frame object internally maintains a Boolean motion flag that can be true or false and represents whether motion of the elevator has occurred within the time frame (the motion flag is true at the end of the time frame) or has not occurred within the time frame (the motion flag is false at the end of the time frame).

If motion of the elevator is detected between the start and end times of the time frame, the motion flag is set to true. If motion of the elevator is detected at a time outside of the time frame, the time-frame object takes no action to change the value of the time flag.

At the beginning of the time frame the time-frame object sets the motion flag to false (if it not already false).

At the end of the time frame the time-frame object checks the status of the motion flag. If the motion flag is true, motion of the elevator has occurred during the time frame. There is no need to generate a notification and the motion flag is reset to false. If the motion flag is false however, motion of the elevator has not occurred during the time frame. The system then issues third party notifications.

In possible embodiments of the disclosed notification system, multiple time-frame objects can be defined within a day or extending across two or more days. Time-frame objects can be defined differently for different days; for example, a time-frame object associated with a Saturday, Sunday, or holiday may be associated with a different time frame than a time-frame object associated with a regular weekday. The multiple time-frame objects may define non-overlapping time periods within a week, a month, a year, or other time period.

Time-frame objects may also be periodic time-frame objects being configured to redefine the start time and end time of the time-frame object to enable periodic operation of the time-frame object. For example, a time-frame object may be active each Tuesday starting at 9 AM and ending at 2 PM, and will redefine its start time and end time to the next Tuesday after the current end time of the time-frame object.

Embodiments of the notification system may monitor two or more devices and may share time-frame objects among devices. For example, if a residence has multiple elevators or stairlifts, a notification system in accordance with this disclosure may monitor the multiple elevators or stairlifts. Time-frame objects can be shared between the elevators or stairlifts or different time-frame objects can be associated with different elevators or stairlifts.

In yet other possible embodiments of the disclosed notification system, "sliding" time-frame objects may be defined. A sliding time-frame object is created when a desired device event occurs within the time frame of a previously defined time-frame object. A sliding time-frame object enables the notification system to continuously monitor a device for timely occurrences of possibly variably spaced events and yet issue notifications should a timely occurrence of the next event not occur.

The notification system may include a user interface that enables creating, editing, and deleting time-frame objects, associating devices with the time-frame objects, and may enable creating, editing, and deleting a list of those third parties who receive the notifications.

A notification system in accordance with this disclosure may be designed to monitor operation of AC-powered household electronics, appliances, medical devices, and conveyances such as (for non-limiting examples): televisions, kettles, toasters, coffee makers, CPAP machines, portable respirators, portable oxygen concentrators, stairlifts, elevators, lift chairs, and lamps.

A notification system in accordance with this disclosure may be designed to monitor 220/240 volt AC-powered heavy duty appliances, industrial machinery, and other commercial or manufacturing equipment.

A notification system in accordance with this disclosure may be designed to monitor the presence or absence of an individual in a home or at a particular location within the home such as in a bed or bathroom, using sensors placed in beds, next to beds, under door mats or rugs, adjacent medicine cabinets or doors, or the like.

A notification system in accordance with this disclosure may be designed for use with automobiles or motor vehicles. For example, a notification system may be designed for use with van conversions for disabled users and can, in possible embodiments, make use of wi-fi hotspot capability built into many of today's vehicles. The notification system may, for example, identify that the vehicle was not moved on a day in which it should have been used by an individual for going to a doctor's appointment.

Application software of either a dedicated notification system or generic notification system in accordance with this disclosure may include a software toggle switch operable to change operation of the notification system from the disclosed non-event notification system to a conventional event notification system that issues alerts upon occurrence of a specific event. The software toggle switch may be operatively connected to a button or other user input device for user selection of the operating mode of the notification system.

Other objects and features of the disclosure will become apparent as the description proceeds, especially when taken in conjunction with the accompanying drawing sheets illustrating one or more illustrative embodiments.

BRIEF DESCRIPTION OF THE DRAWINGS

FIG. 4 illustrates construction of a motion event by the notification system shown in FIG. 1.

FIG. 5 is a sequence diagram illustrating another aspect of operation of the notification system shown in FIG. 1.

DETAILED DESCRIPTION

Figure 1:
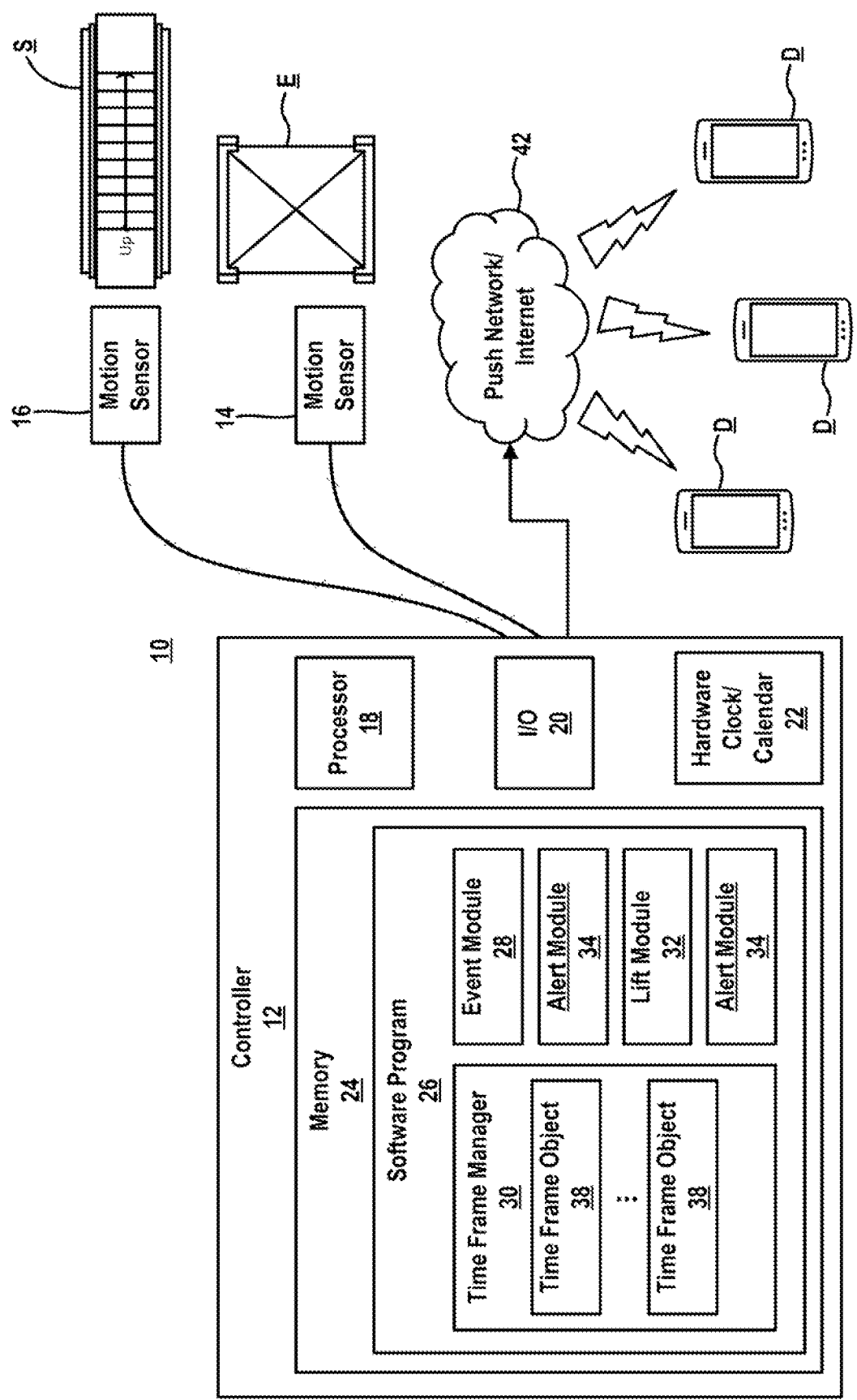
FIG. 1 is a schematic view of a first embodiment notification system used with an elevator and stairlift in accordance with this disclosure.

FIG. 1 illustrates a dedicated notification system 10 in accordance with this disclosure. The notification system 10 as embodied in FIG. 1 monitors motion of two lifts located in a residence, the two lifts being an elevator E and a stairlift S.

The mobility notification system 10 includes a controller 12 operatively connected to a motion sensor 14 and to a motion sensor 16, each motion sensor connected wirelessly or by wire with the controller. The motion sensor 14 monitors motion of the elevator E and the motion sensor 16 monitors motion of the stairlift S. Each motion sensor generates a signal transmitted to the controller representing a device event when the motion sensor detects motion of its associated lift. The device event in the illustrated embodiment is a motion event associated with motion of the lift. The motion sensor 14, 16 can be motion sensors known in the lift art, including for example infrared, level, current, load, and hall-effect sensors, limit switches, encoders, and the like.

The controller 10 can be implemented as an embedded or non-embedded computer having a microprocessor 18, I/O (input/output) device 20, a hardware clock/calendar 22 (which may be a real-time clock), and memory 24. The hardware clock may be a real time clock.

The processor 18 can be a microprocessor manufactured or licensed by Intel™, AMD™, ARM™, and others. The processor can have an 8-bit architecture, a 16-bit architecture, a 32-bit architecture, a 64 bit architecture, or other architecture. The processor can be a single core processor or a multi-core processor. The processor may implement a virtual computer architecture in the memory 24 and may operate a real-time operating system.

The I/O device 20 defines an I/O communication path between the controller and the motion sensors to transmit signals or data from the motion sensors to the controller and further allows the controller to receive and transmit data external from the controller. The I/O device may include wired or wireless ports (such as wired or wireless Ethernet ports, Bluetooth ports, WIFI ports, antennas, and the like) that receive and transmit the data. The illustrated I/O device has ports that receive the signals from the motion sensors 14, 16, transmit notifications from the controller, and interact with a user utilizing the controller's user interface.

The clock/calendar 22 provides timestamps (that include the date and time) for the receipt of signals from the motion sensors 14, 16 and provides time information for determining the start and end times of time-frame objects (described in more detail below).

The memory 24 is a computer-readable medium that may include both volatile and non-volatile memory. The memory may store user information such as the address of the residence, third-party contact information, and the like useful for operating the notification system 10.

During operation of the controller 10 the memory 24 stores a software program 26 that responds to motion events, determines whether to issue notifications based on the motion events, issues the notifications, and provides a user interface.

The illustrated software program 26 includes an event module 28, a time-frame manager 30, a lift module 32, a notification module 34, and a UI module 36.

The event module 28 monitors the I/O device for signals received from the motion sensors 14, 16.

Figure 2:
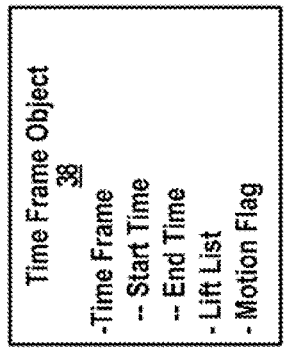
FIG. 2 illustrates the members of a time-frame object of the notification system shown in FIG. 1.

The time-frame manager 30 manages a collection of time-frame objects 38 (see FIG. 2). A time-frame object stores data defining a time frame, including the start time of the time frame, the end time of the time frame, and when the time-frame object is active (on a specific day of the week, for a set of days of the week, on a specific date or holiday, and so on). The start time and end time can be stored as Coordinated Universal Time (or UTC) or can be stored as local time.

A time-frame object 38 also includes a list of the lifts included in the lift module 32 (described below) that are associated with the time-frame object, and a Boolean motion flag that represents whether motion of one of the lifts in the lift list has occurred within the time frame (true) or has not occurred (false) within the time frame.

When a time-frame object 38 is created, by default the motion flag is set to true if the time-frame object is created at a time outside of the time-frame object's time frame, that is, before the start time and after the end time of the time frame. The motion flag is set to false otherwise. A user creating the time-frame object may have the ability to override the default motion flag settings.

A time-frame object 38 operates similarly as a software alarm or scheduler and regularly checks the clock 22 for the current time to be either the start of the time frame or the end of the time frame (with appropriate correction for Daylight Savings Time).

Figure 3:
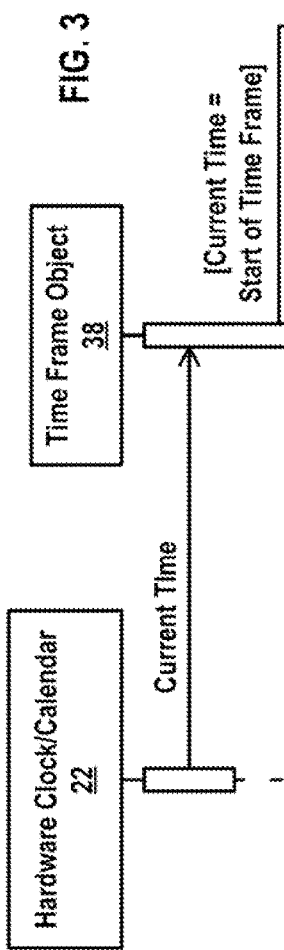
FIG. 3 is a sequence diagram illustrating an aspect of operation of the notification system shown in FIG. 1.

The time-frame object sets its motion flag to be false at the start of the time-frame object's time frame. See the Sequence Diagram shown in FIG. 3. When the current time is the end of the time frame, the time-frame object determines whether or not a notification should issue as will be described in more detail below, and then sets its motion flag to false. In this way the motion flag is always false at the start of the time frame.

The lift module 32 stores information about the individual lifts being monitored by the system 10 and which motion sensors are associated with which lifts.

The notification module 34 cooperates with the I/O device 10 in preparing and transmitting notifications to devices D of remote third parties. A notification issues if necessary at the end of a time frame and notifies the third parties that there was no motion of the lift within the time frame. Notifications are transmitted via the internet through a push network 42. A push network provides a push notification service that transmits the notifications to the devices D received an app on each device D.

The UI module 36 provides the user interface for creating, editing, and deleting time-frame objects, the list of lifts managed by the system 10, and the list of third party devices that will receive notifications. Data used to operate the software program 10 can be maintained entirely within the memory 24 or can be stored in whole or in part in the cloud or in other remote memory stores.

Operation of the mobility notification system 10 in monitoring the elevator E and stairlift S and issuing any necessary notification is described next. Essentially, each time-frame object at the end of its time frame checks whether its motion flag is set to false. If so, there has been no movement of any lift associated with that time-frame object within its time frame window, and the time-frame object causes a notification to be generated that is transmitted to the third party devices 42.

When a signal from a motion sensor 14, 16 indicating motion of the lift monitored by that motion sensor is received by the I/O device, the event module 28 identifies which motion sensor sent the signal and which lift is associated with the signal. The event module also queries the clock/calendar 22 for a timestamp providing the time/date of receipt of the signal.

The event module then constructs a motion event 40 (see FIG. 4). The motion event includes the identity of the motion sensor transmitting the signal, the identity of the lift associated with that motion sensor, and the timestamp recording the time/date of receipt of the signal. The event module transmits the motion event to the time-frame manager 30. See the Sequence Diagram shown in FIG. 5.

The time-frame manager 30 provides the motion event 40 to each time-frame object 38. Each time-frame object 38 determines whether the lift associated with the motion event is a lift included in the time-frame object's list of lifts.

If the lift is not included in the list of lifts of the time-frame object 38, the time-frame object ignores the motion event. Otherwise, the time-frame object from the motion event timestamp whether the motion event occurred in the time-frame object's time frame. If so, the time-frame object's motion flag is set to true.

As mentioned previously each time-frame object 38 operates similarly as a software alarm or scheduler and regularly checks the clock 22 for the current time. If the current time is the end of the time-frame object's time frame, the time-frame object checks its motion flag to determine whether motion of a lift associated with the time-frame object has occurred within the time frame. See the Sequence Diagram shown in FIG. 6.

If the motion flag is true, motion has occurred within the time frame and the time-frame object takes no action to have a notification issue.

Figure 6:
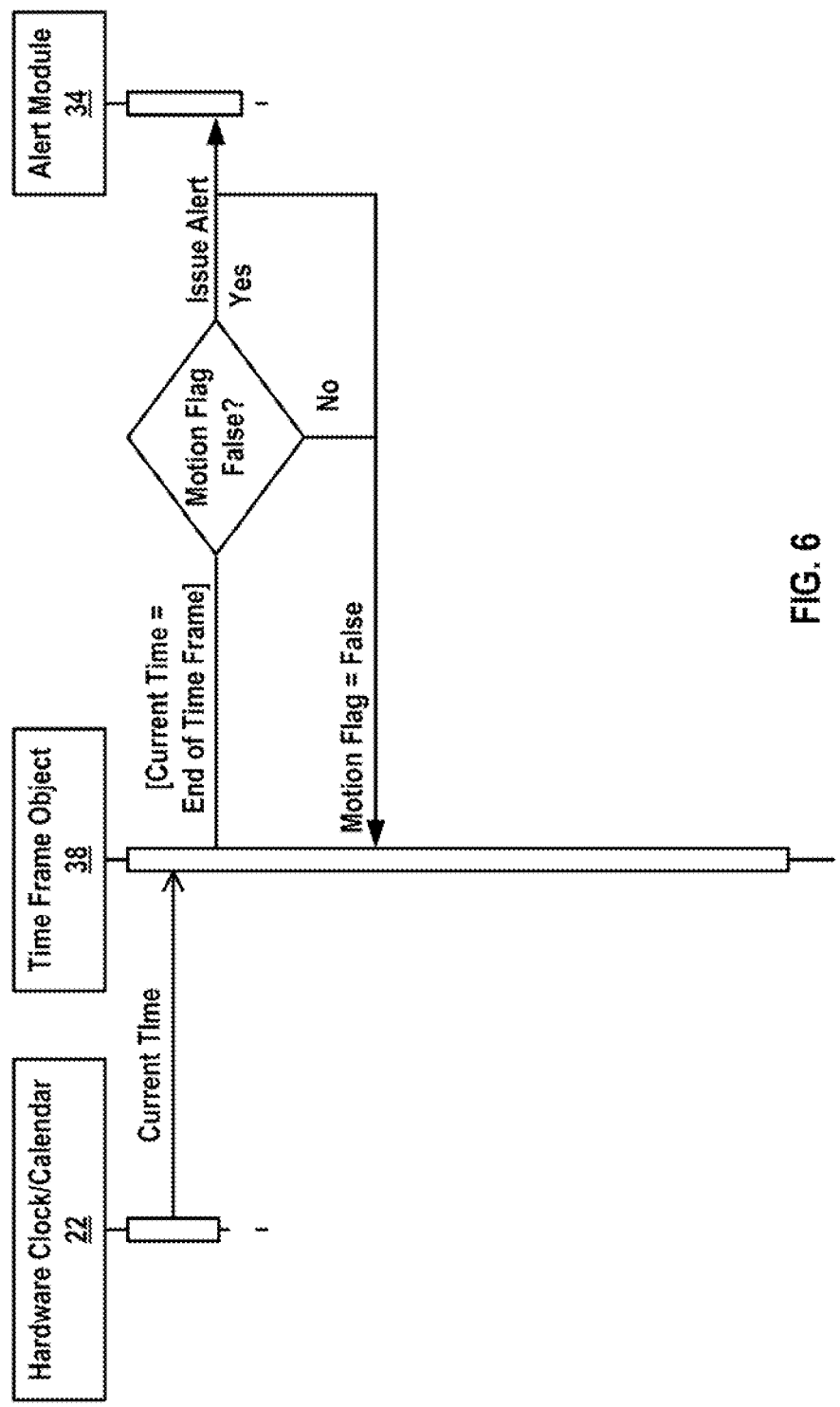
FIG. 6 is a sequence diagram illustrating yet another aspect of operation of the notification system shown in FIG. 1.

If the motion flag is set to false, motion has not occurred and it is necessary to issue a notification. The time-frame object can either notify the notification module 34 directly to issue the notification as shown in FIG. 6, or the time-frame object can request the time-frame manager to notify the notification module to issue the notification.

Figure 7:
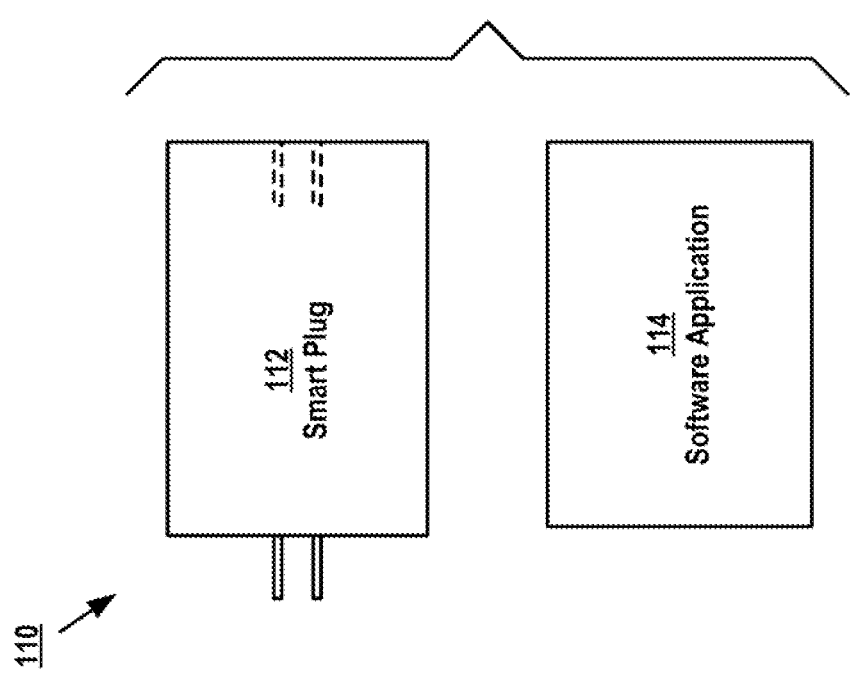
FIG. 7 illustrates the hardware and software components of a second embodiment notification system in accordance with this disclosure.

FIG. 7 illustrates the major components of a generic notification system 110 in accordance with this disclosure. The generic notification system 110 is used to monitor a device that is electrically powered using a standard electrical plug being plugged into a standard electrical socket connected to a source of AC power (such as the power grid, an AC generator, or the like). The generic notification system The notification system 110 includes a "smart plug" hardware component 112 and a software application component 114 corresponding to the software application component 26 of the dedicated notification system 10.

Figure 8:
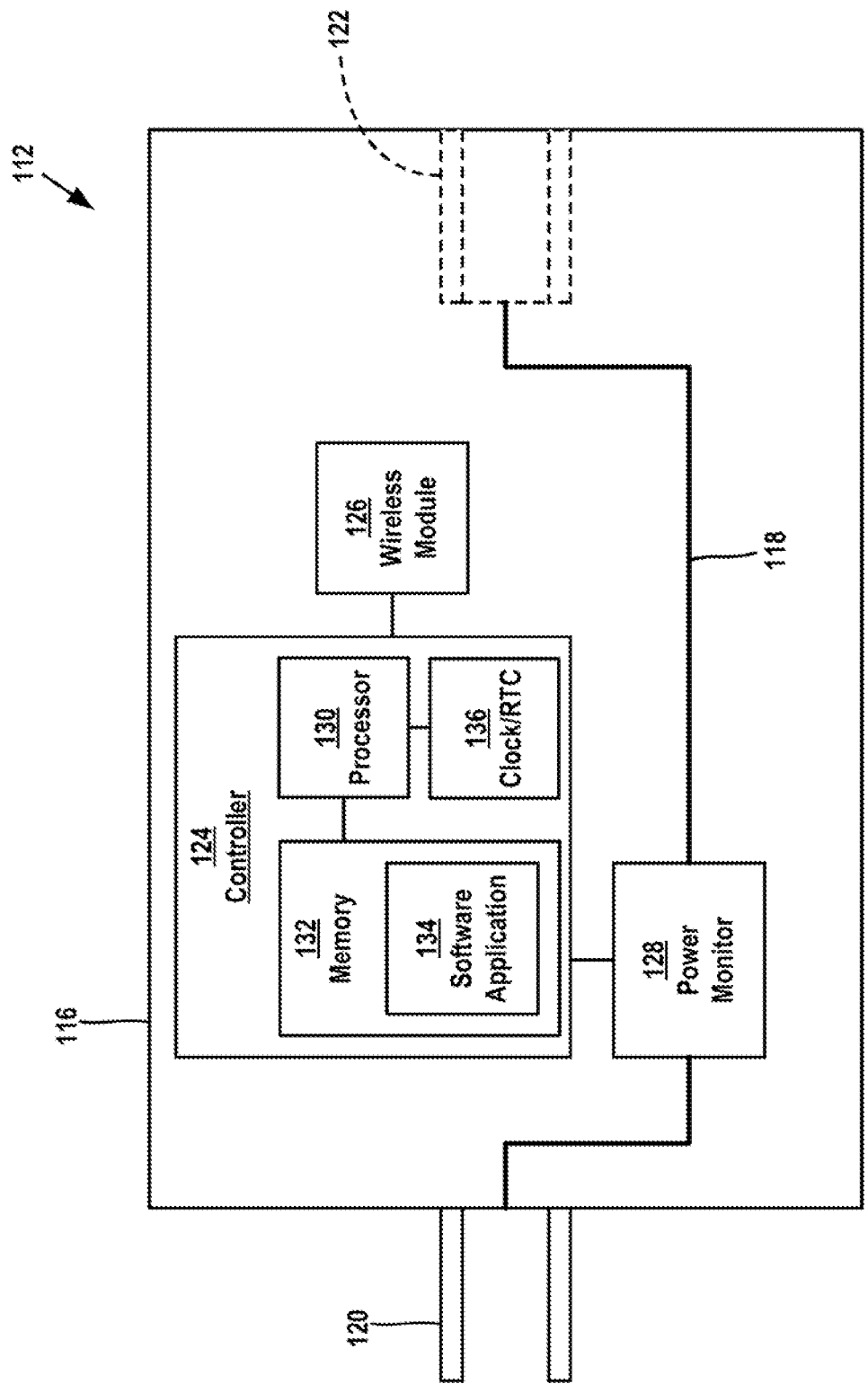
FIG. 8 illustrates the components of a smart plug of the notification system shown in FIG. 7.

The smart plug 112 shown in FIG. 8 includes a casing 116 that houses AC wiring 118 connecting a standard electrical plug 120 extending from one side of the casing and a standard electrical socket 122 extending into the casing and accessible from the opposite side of the casing.

The illustrated plug and socket are configured for use in the United States and can in alternative embodiments be configured for use in other countries or regions. The locations of the plug and socket with respect to the casing can vary from the illustrated embodiment.

In use, the device plug is inserted into the smart plug socket 122 and the smart plug electrical plug 120 is inserted into an external electrical socket connected to a source of AC power. The smart plug AC wiring 118 flows current from the external electrical socket to the device plug.

A controller 124, a wireless module 126, and a power monitor 128 are also disposed in the casing 116. The smart plug 112 may include other components (not shown) such as power circuitry (rectifiers, USB ports, AC adapter ports, voltage converters and regulators, and the like) to power the active components of the smart plug, battery backup, a USB port for power or as an additional communications port, indicia LEDs for power and data transmission, a memory card slot to add additional memory, an external antenna jack, and the like.

The controller 124 is formed as a printed circuit board that carries a computer processor 130 connected to a memory 132 that enables the processor to execute software application code 134 stored in the memory. A real-time clock 136 provides the time and may provide timestamps as need by the software application. The processor 130 includes input/output such as GPIO pins that connect the processor 130 to the wireless module 126 and the power monitor 128.

The illustrated wireless module 126 provides Wi-Fi and Bluetooth connectivity with an integral antenna. The wireless module may include its own computer processor, memory, and operating system. Wi-Fi allows direct connection of the controller 124 to the internet through a Wi-Fi router. Bluetooth enables the controller 124 to connect to a nearby smart phone or tablet. The wireless module 126 may provide the ability to function as a web server serving HTML pages and forms used with the software application component 114.

An example of a wireless module that may be adapted for use as the wireless module 126 is the ESP32-WROOM-32 circuit module available from Espressif Inc., Shanghai, China or the TYWE3S circuit module available from Tuya Global Inc., Santa Clara, CA.

The wireless module hardware in possible embodiments may also form the processor 124 and memory 132 of the controller 124. Software development kits are available from the manufacturers of the processor 124 or from third parties for embedded programming of the processor 124.

The power monitor 128 actively samples and measures the power passing through the AC wiring 118. The measurement data is passed as digital data to the controller 124 for use by the software application 134, and may include a timestamp associated with the data. The measurement data may, in embodiments, be provided to the controller each one-quarter second, each one-half second, each second, or some other time interval.

An example of a power monitor that may adapted for use as the power monitor 128 is the MAXQ3180 or MAXQ3183 power module available from Maxim Integrated, San Jose, CA.

In alternative embodiments of the smart plug 112, the smart plug may be designed for use with DC-powered devices and includes a power monitor to monitor DC power.

The software application 134 uses the data from the power monitor 128 to determine, for example, that the amperage of electrical current through the AC wiring 118 has increased to deliver increased power to the device (a POWER ON event) or that the amperage has decreased or even dropped to zero to deliver decreased or no power to the device. That is, the software application 134 can detect, with respect to a device attached to the smart plug 112, whether the device has had a POWER ON event or has had a POWER OFF event, and determine the specific time/date of the POWER ON or POWER OFF event.

A user may be asked to cycle the device through a POWER ON event and a POWER OFF event before using the smart plug 112 to verify that the controller software can recognize POWER ON and POWER OFF events.

In application of the notification system 110, a non-event may be defined by a user as either the failure of the device to POWER ON within the time interval defined by a time-frame object or to POWER OFF within the time interval defined by a time-frame object.

Embodiments of the smart plug 12 may have sufficient memory and processing power to enable the functional components of the software application component 114 that determine whether or not to issue notifications of a non-event to be realized entirely as the software application 134 stored in the controller memory 132 and executed by the controller 124. That is, the software application 134 may include time-frame object data and notification recipient data, routines to determine whether a non-event has occurred at an end of a time period defined by a time-frame object, and routines to emit notifications via the internet, cellular network, and/or local network using the wireless module 126.

The software application 134 may provide a user interface accessible to users through the wireless module 126 to define and edit time-frame objects or to perform or edit system configuration. Alternatively, a separate software application may additionally be provided for the convenience of the user that executes on a remote computer (cell phone, tablet, desktop) that communicates with the wireless module 126 (or, for example, a serial cable attached to a serial port in the smart plug 112) to define and edit time-frame objects or to perform or edit system configuration.

Other embodiments of the smart plug 112 may not have sufficient memory or processing power to enable the smart plug controller 124 execute functional components of the software application component 114.

Figure 9:
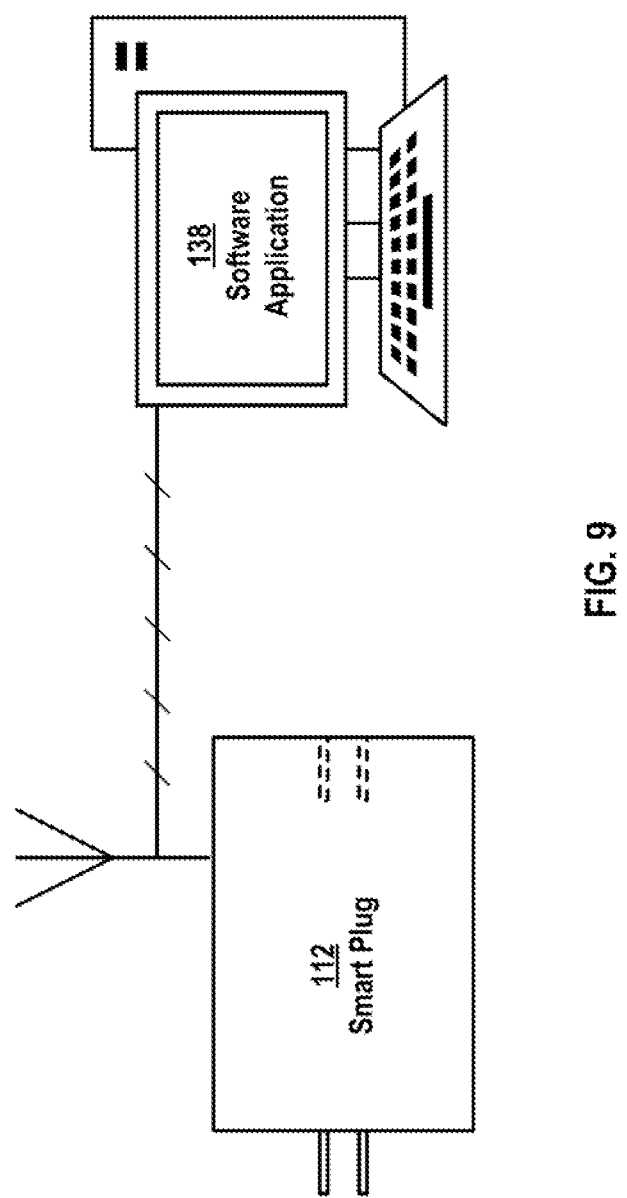
FIG. 9 illustrates the smart plug shown in FIG. 8 transmitting data to a remote computer.

In such embodiments the controller 124 may emit data representing POWER ON and POWER OFF events to a software application 138 running on a remote computer. See FIG. 9, in which the controller utilizes the wireless module 126 for wireless transmission of the data to the remote computer via Wi-Fi. The data of a POWER ON or POWER OFF event may be transmitted immediately after the event, or a list of POWER ON and POWER OFF events may be transmitted on a periodic basis (for a non-limiting example, once per second).

The software application 138 running on the remote computer forms the part of the software application 114 that executes the functional components of the software application 114. That is, the software application 138 includes time-frame object data and notification recipient data, routines to determine whether a non-event has occurred at an end of a time period defined by a time-frame object, and routines to emit notifications via the internet, cellular network, and/or local network independently of the wireless module 126 or using the wireless module 126.

Figure 10:
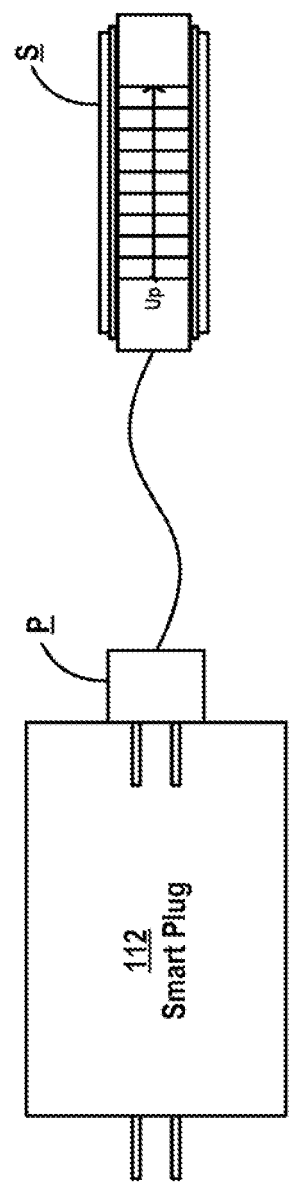
FIG. 10 illustrates use of the second embodiment notification system with a stairlift.

FIG. 10 illustrates the notification system 110 being used to monitor the stairlift S previously described. The stairlift S includes a standard plug P for use with a standard 110 volt home electrical outlet (not shown). The plug P is plugged into the socket of the smart plug 112 and the plug of the smart plug is plugged into the home electrical outlet.

In the illustrated embodiment, actuating the stairlift to begin motion of the stairlift generates a POWER ON event. After the stairlift stops, a POWER OFF event is generated. The smart plug 112 emits POWER ON and POWER OFF events data through the wireless module 126 to an internet router R. The router R is turn connected to a computer C by an Ethernet cable E.

The software application portion 138 defines the same time-frame objects as was used in the notification system 10. A non-event is defined as the failure of a POWER ON event to have occurred within a time frame. The computer C executes the software application portion 138 using the event data transmitted from the smart plug 112. The software application 138 uses the POWER ON/POWER OFF event data essentially the same way the notification system 10 used motion sensor event data to determine a non-event.

If a non-event is detected, the software application 138 sends out notifications the same way as did the dedicated notification system 10.

The stairlift S is intended to be representative of a powered device that can be monitored by the generic notification system 110. It is understood that the stairlift S is exemplary only and is not intended to be limiting or preclude use of a dedicated notification system or a generic notification system in accordance with this disclosure with other devices, including (but not limited to), medical devices, CPAP (continuous positive airway pressure) machines, home appliances, industrial and commercial equipment, and any other devices or apparatus in which notifications of non-events is desired.

The smart plug 112 and its associated software may, in other possible embodiments, provide additional features in addition to the notification of non-events. For example, the smart plug 112 may use the capabilities of the power monitor 126 to provide a history of power usage of the device attached to the smart plug 112. The smart plug 112 may be programmed to provide other notifications for other types of events, such as a loss of power or other fault condition. For example, the power monitor 126 may detect from its power measurements a power failure or a short circuit and provide notifications of such fault events.

Figure 11:
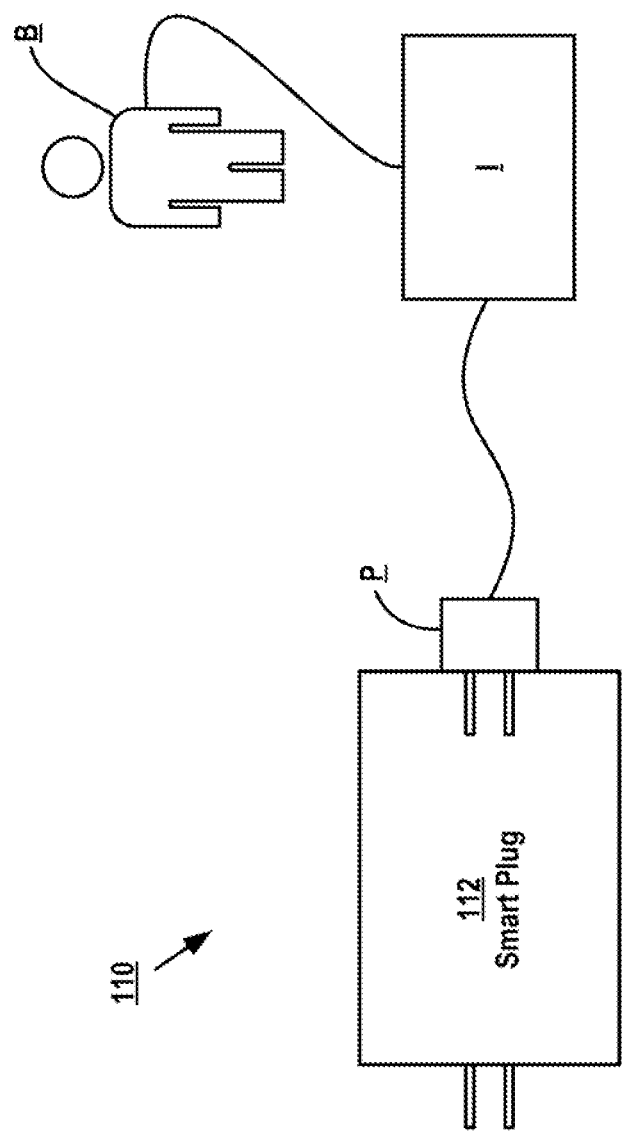
FIG. 11 illustrates use of the second embodiment notification system with a medical device.

FIG. 11 illustrates an embodiment of a sliding time-frame object. The notification system 110 has been previously described and in FIG. 11 is used in monitoring a medical device, namely an infusion pump I. The infusion pump, when energized, delivers a medication into the body of a patient B. The patient requires a controlled amount of medication be infused at most every two hours after a prior infusion. The notification system 110 monitors infusion pump energization and issues a non-event notification should the infusion pump not be energized after two hours from a previous energization.

The infusion pump I, however, is also set up to immediately infuse medication should the patient's temperature increase above a predefined ceiling temperature. To accommodate the fact that energization of the infusion pump I is unpredictable and may occur at any time, the notification system 110 is programmed to create a new 2-hour time-frame object and delete an existing 2-hour time-frame object each time the infusion pump is energized. This enables the notification system to issue a non-event notification at the end of a time-frame object regardless of when the last infusion pump energization occurred.

The notification system 110 is also configured to output notifications should a loss of power occur or some other electrical fault condition occur.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in sensor type, controller hardware and software, processor architecture, size and type of memory, software architecture and operating system, environment of use, number and types of devices being monitored, transmittal mechanisms of notifications, and the like, as well as such changes and alterations that fall within the purview of the following claims.

The invention claimed is:

1. A system for monitoring a device for failure of a device event to occur within a specified time frame, the time frame having a start time and an end time, the system comprising:
a controller and an I/O communication path connected to the controller, the I/O communication path being operatively connected to the device to recognize device events and to transmit signals or data representing such device events to the controller;
the controller being configured to determine from the data or signal received from the I/O communication path whether a device event has occurred and the time that the device event has occurred;
the controller being configured to store data representing the device event and the time at which the device event occurred
the controller being configured to store at least one time-frame object having a start time and an end time spaced apart in time from the start time, the controller being configured to determine that a time-frame object has expired;
the controller being configured to determine upon expiration of the time-frame object whether a device event had occurred between the start time of the time-frame object and the end time of the time-frame object and, if the software application determines that a device event had not occurred between the start time of the time-frame object, to output a notification of the failure of the device event to occur.

2. The system of claim 1 wherein the I/O communication path comprises a sensor operatively connected to the device, the sensor being configured to transmit a signal or data representing the device event to the controller when a device event occurs.

3. The system of claim 2 wherein the sensor is one of: a motion sensor, a proximity sensor, a pressure sensor, a flow sensor, a door sensor, a window sensor, a thermometer, or a thermocouple.

4. The system of claim 1 wherein the device comprises a plug being configured to be plugged into an electrical socket to power the device, and the I/O module comprises a smart plug;
the smart plug being configured to be plugged into the electrical socket and to receive the plug of the device to transmit electrical power from the electrical socket to the device;
the smart plug further being configured to recognize a device event related to changes in electrical power being transmitted through the smart plug to the device.

5. The system of claim 4 wherein the smart plug transmits data through the I/O communication path representing a time stamp associated with the power event.

6. The system of claim 1 wherein the I/O communication path transmits a plurality of different types device events to the controller and the controller associates a different time-frame object with each type of device event.

7. The system of claim 6 wherein the I/O communication path comprises a plurality of sensors operatively connected to the device, each sensor associated with a different type of device event of the plurality different types of device events and being configured to transmit a signal or data representing the device event to the controller when the device event associated with the sensor occurs.

8. The system of claim 1 wherein the time-frame object maintains a Boolean flag that represents whether or not the device event associated with the time-frame object has occurred within the time frame associated with the time-frame object.

9. The system of claim 8 wherein the time-frame object does not react to device events of the type associated with the time-frame object when such device events occur outside of the time frame associated with the time-frame object.

10. The system of claim 1 wherein the time-frame object is a sliding time-frame object.

11. The system of claim 10 wherein the sliding time-frame object is a current sliding time-frame object and the controller is configured to create a new sliding time-frame object when a device event associated with the current sliding time-frame object occurs in the time frame of the current sliding time-frame object.

12. The system of claim 1 wherein the at least one time-frame object is a periodic time-frame object.

13. The system of claim 1 wherein the device is one of a plurality of devices monitored by the system for failure of a respective device event associated with each device of the plurality of devices within a specified time frame wherein:

the I/O communication path operatively connects each device of the plurality of devices to the controller and transmits signals or data representing device events of each device of the plurality of devices to the controller;

the controller being configured to determine from the data or signal received from through the I/O communication path whether a device event has occurred, the time that the device event has occurred, and the device to which the device event occurred;

the controller being configured to store data representing the device event, the time at which the device event occurred, and the device to which the device event occurred;

the controller being configured to store at least one] time-frame object associated with each device of the plurality of devices, the time-frame object having a start time and an end time spaced apart in time from the start time, the controller being configured to determine that a time-frame object has expired;

the controller being configured to determine upon expiration of a time-frame object of the time-frame objects associated with the plurality of devices whether a device event had occurred between the start time of the time-frame object and the end time of the time-frame object and, if the software application determines that a device event had not occurred between the start time of the time-frame object, to output a notification of the failure of the device event to occur.

14. The system of claim 13 wherein at least one time-frame object is associated with at least two of the plurality of devices whereby the at least one time-frame object is shared among a plurality of devices.

15. The system of claim 1 wherein each at least one time-frame object is configured to notify the controller whether a device event associated with the time-frame object occurred between the start time and end time of the time-frame object.

16. The system of claim 1 comprising a user interface that enables a user to create, edit, delete time-frame objects and to determine the destination or destinations of a notification issued by the system.

17. The system of claim 1 wherein the controller comprises a microprocessor and program instructions of a software application stored in computer-readable memory, the software application being configured to perform the system operations in monitoring the device for failure of a device event to occur within a specified time frame and to output a notification of a failure of the device event to occur within the time frame.

18. The system of claim 17 wherein the microprocessor executes the program instructions of the software application.

19. The system of claim 17 wherein the program instructions of the software application are executed by a second microprocessor and the determination of the failure of the device event to occur within the specified time frame is communicated to the controller microprocessor.

20. The system of claim 1 wherein the controller outputs the notification of the failure of the device event wirelessly through the I/O communication path utilizing at least one of: Wi-Fi and Bluetooth.

* * * * *